(12) United States Patent
Wolfinger et al.

(10) Patent No.: US 9,989,250 B2
(45) Date of Patent: Jun. 5, 2018

(54) AUTOMATIC GAS TORCH IGNITION IN AN OXYGEN RICH ENVIRONMENT

(75) Inventors: Mike Wolfinger, Newbury, NH (US); Brandon Hebert, Williamstown, VT (US); Darrin MacKenzie, Windsor, VT (US); Chris Conway, Wilmot, NH (US)

(73) Assignee: Victor Equipment Company, Denton, TX (US)

( * ) Notice: Subject to any disclaimer, the term of this patent is extended or adjusted under 35 U.S.C. 154(b) by 1467 days.

(21) Appl. No.: 12/849,029

(22) Filed: Aug. 3, 2010

(65) Prior Publication Data
US 2012/0034567 A1 Feb. 9, 2012

(51) Int. Cl.
F23N 1/00 (2006.01)
F23D 14/46 (2006.01)
F23D 14/42 (2006.01)
F23N 3/00 (2006.01)

(52) U.S. Cl.
CPC ........... F23D 14/465 (2013.01); F23D 14/42 (2013.01); F23N 3/002 (2013.01); F23N 2027/02 (2013.01); Y02E 20/344 (2013.01)

(58) Field of Classification Search
CPC ...... F23N 3/002; F23N 2027/02; F23D 14/42; F23D 14/465
USPC .......................... 431/12, 346; 60/39.826, 740
See application file for complete search history.

(56) References Cited

U.S. PATENT DOCUMENTS

| | | | | |
|---|---|---|---|---|
| 2,213,748 A | * | 9/1940 | Stettner ................. | F23D 14/465 137/607 |
| 3,155,140 A | * | 11/1964 | Wilson ................... | F23D 14/38 431/153 |
| 3,220,459 A | * | 11/1965 | Wilson ................... | F23Q 3/002 219/70 |
| 3,255,803 A | * | 6/1966 | Hach, Jr. ................ | F23D 14/38 431/255 |
| 3,280,881 A | * | 10/1966 | Hach, Jr. ................ | F23D 14/34 310/339 |
| 3,694,134 A | * | 9/1972 | Ross ....................... | F23Q 3/002 361/260 |
| 3,858,808 A | * | 1/1975 | Dillon .................... | 239/429 |
| 4,295,820 A | * | 10/1981 | Roeder et al. ........... | 431/191 |
| 4,348,172 A | * | 9/1982 | Miller .................... | 431/255 |
| 4,363,443 A | * | 12/1982 | Huehne ................... | F23D 14/38 239/419.3 |
| 4,433,358 A | * | 2/1984 | Kubota ................... | F23Q 3/002 361/260 |
| 4,519,541 A | * | 5/1985 | Rotolico ................. | 239/1 |
| 4,818,220 A | * | 4/1989 | Kobayashi ............. | F23D 14/42 431/264 |
| 4,818,610 A | * | 4/1989 | Zimmerman et al. ........ | 428/345 |

(Continued)

OTHER PUBLICATIONS

Smith Equipment Product Catalog Circa 2008.*
Oxyfuel Cutting Tech Cell by John Uccellini Sep. 13, 2005 http://www.thefabricator.com/article/oxyfuelcutting/safety-the-burning-issue-in-oxyfuel-torch-use.*

Primary Examiner — Avinash Savani
Assistant Examiner — Martha Becton
(74) Attorney, Agent, or Firm — Edell, Shapiro & Finnan, LLC

(57) ABSTRACT

A method of starting an auto-ignition gas torch includes increasing a flow of oxygen above zero and increasing a flow of fuel gas to a level lower than the flow of oxygen for improved start reliability. In one form, the flow of oxygen is from about two times to about six times higher than the flow of fuel gas.

20 Claims, 11 Drawing Sheets

(56) References Cited

U.S. PATENT DOCUMENTS

| | | | | |
|---|---|---|---|---|
| 4,915,360 A | * | 4/1990 | Goulet et al. | 266/48 |
| 4,985,610 A | * | 1/1991 | Rucker et al. | 219/70 |
| 5,273,216 A | * | 12/1993 | Goulet | F23D 14/42 |
| | | | | 239/404 |
| 5,407,348 A | * | 4/1995 | Mims | F23D 14/42 |
| | | | | 137/454.2 |
| 5,470,227 A | * | 11/1995 | Mims et al. | 431/255 |
| 5,597,497 A | * | 1/1997 | Dean | H05H 1/34 |
| | | | | 219/121.39 |
| 5,700,421 A | * | 12/1997 | Bissonnette | 266/48 |
| 2004/0041310 A1 | * | 3/2004 | Hlavacek | B23K 7/08 |
| | | | | 266/225 |
| 2009/0253089 A1 | * | 10/2009 | Talkington | F23D 14/42 |
| | | | | 431/255 |
| 2010/0071343 A1 | * | 3/2010 | Yu | F02K 9/95 |
| | | | | 60/39.826 |
| 2010/0171014 A1 | * | 7/2010 | Stemple | F16M 11/04 |
| | | | | 248/201 |
| 2013/0082156 A1 | * | 4/2013 | Conner | F16M 11/08 |
| | | | | 248/281.11 |
| 2013/0187019 A1 | * | 7/2013 | Dittmer | F16M 11/10 |
| | | | | 248/277.1 |

* cited by examiner

AUTOMATIC GAS TORCH IGNITION IN AN OXYGEN RICH ENVIRONMENT

FIELD

The present disclosure relates generally to oxy-fuel torches and more particularly to oxy-fuel torches having built-in electrical ignition systems, or auto-ignition systems.

BACKGROUND

The statements in this section merely provide background information related to the present disclosure and may not constitute prior art.

Oxy-fuel torches, or gas torches, generally employ oxygen and a fuel gas, such as acetylene or propane, by way of example, to cut or heat a workpiece. More specifically, preheat oxygen and the fuel gas are mixed and ignited to provide heat to the workpiece, and then additional oxygen, commonly referred to as cutting oxygen, is added to react with the heated workpiece. This reaction of the cutting oxygen with the heated workpiece initiates sufficient heat and momentum of the gases to initiate a cutting process.

A typical auto-ignition gas cutting torch employs a piezoelectric igniter and spark source near the handle of the torch. To start the gas torch, the operator activates a trigger connected to the piezoelectric igniter to ignite a mixture of the preheat oxygen and the fuel gas. Typically, the mixture of the preheat oxygen and the fuel gas is a fuel-rich mixture. The level of the fuel gas is set to be significantly higher than the level of the preheat oxygen so that the mixture creates a highly carbonizing environment to facilitate ignition of the mixture. Once the mixture of the fuel gas and the preheat gas is ignited, the operator releases the trigger and further adjusts the flow of fuel gas and the cutting oxygen gas to optimize the flame and initiate the cutting process.

SUMMARY

In one form of the present disclosure, a method of starting an auto-ignition gas torch includes increasing a flow of oxygen above zero, and increasing a flow of fuel gas to a level lower than the flow of oxygen. The flow of oxygen is from about two times to about six times higher than the flow of fuel gas.

In another form, a method of starting an auto-ignition gas torch includes increasing a flow rate of oxygen to level that is an order of magnitude higher than a flow rate of the fuel gas.

In still another form, a method of starting an auto-ignition gas torch includes providing a flow rate of oxygen that is higher than a flow rate of fuel gas. When the fuel gas is acetylene, the flow of oxygen is from about 10 SCFH to about 22 SCFH and the flow of fuel gas is from about 1.5 SCFH to about 4 SCFH.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8:
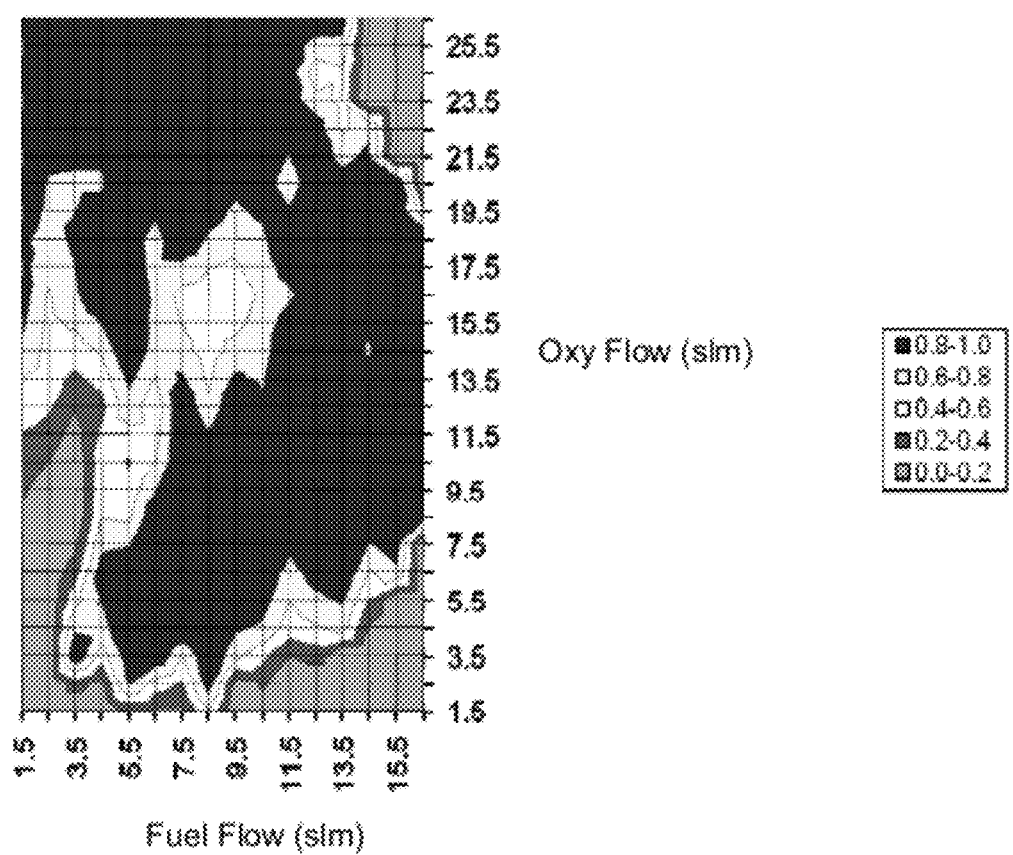
Figure 9:
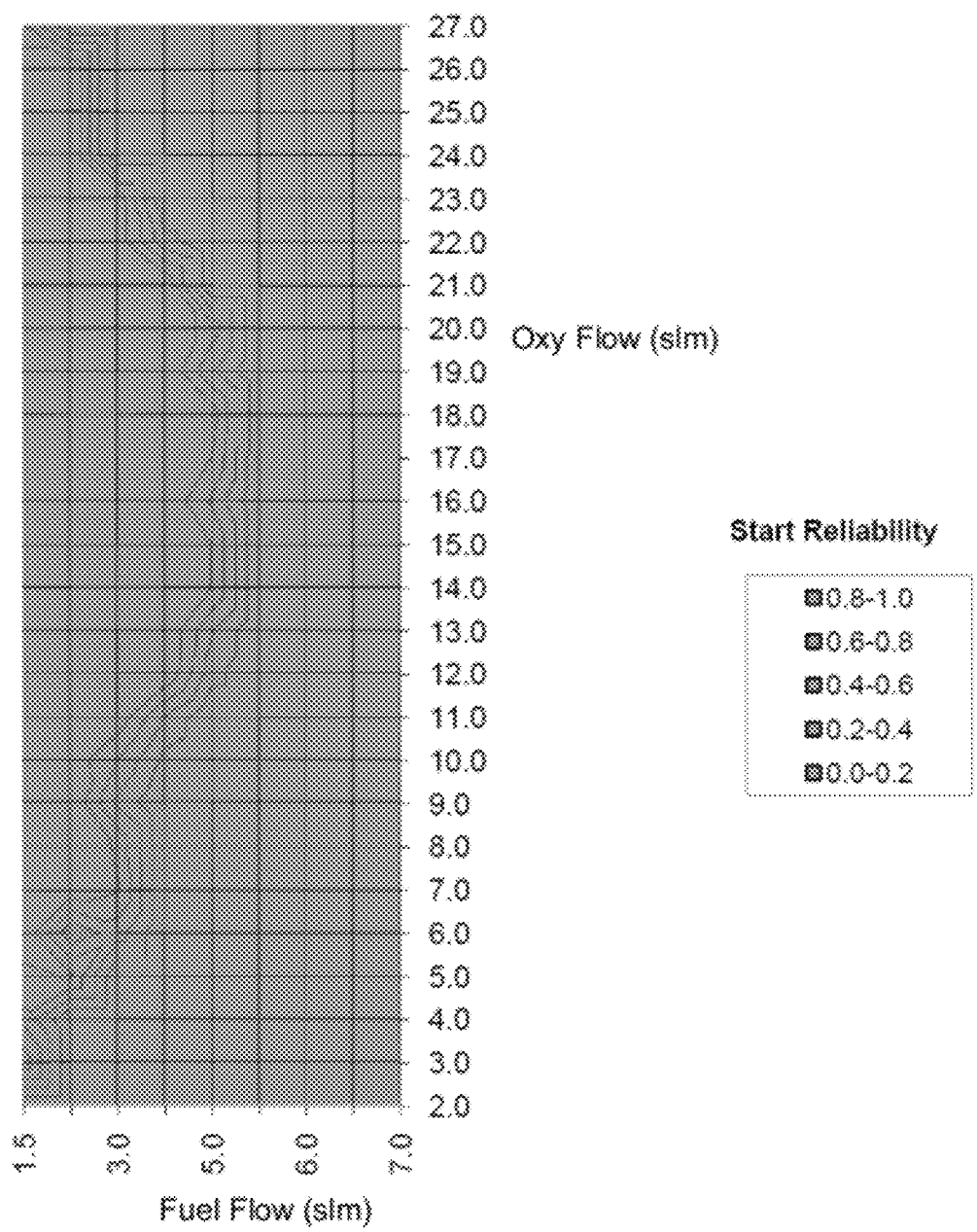
Figure 10:
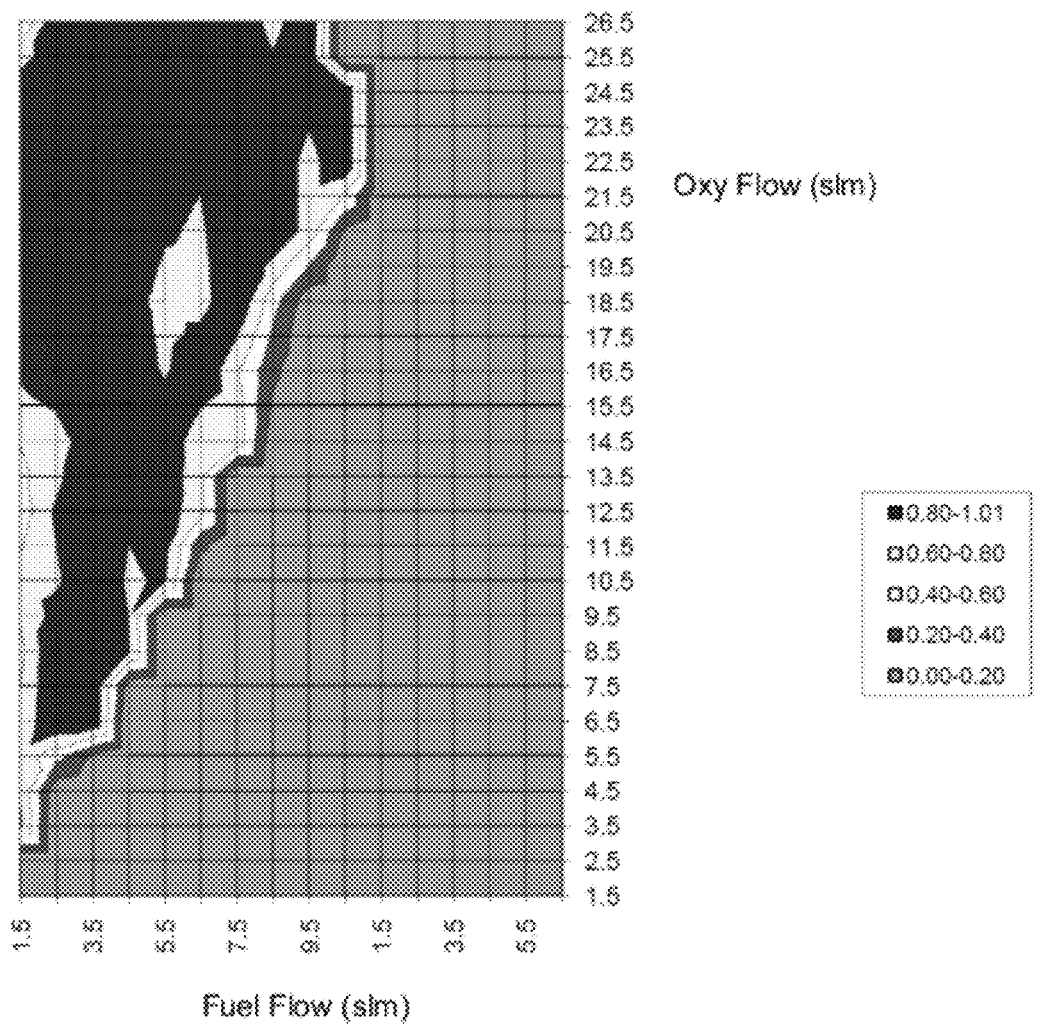
Figure 11:
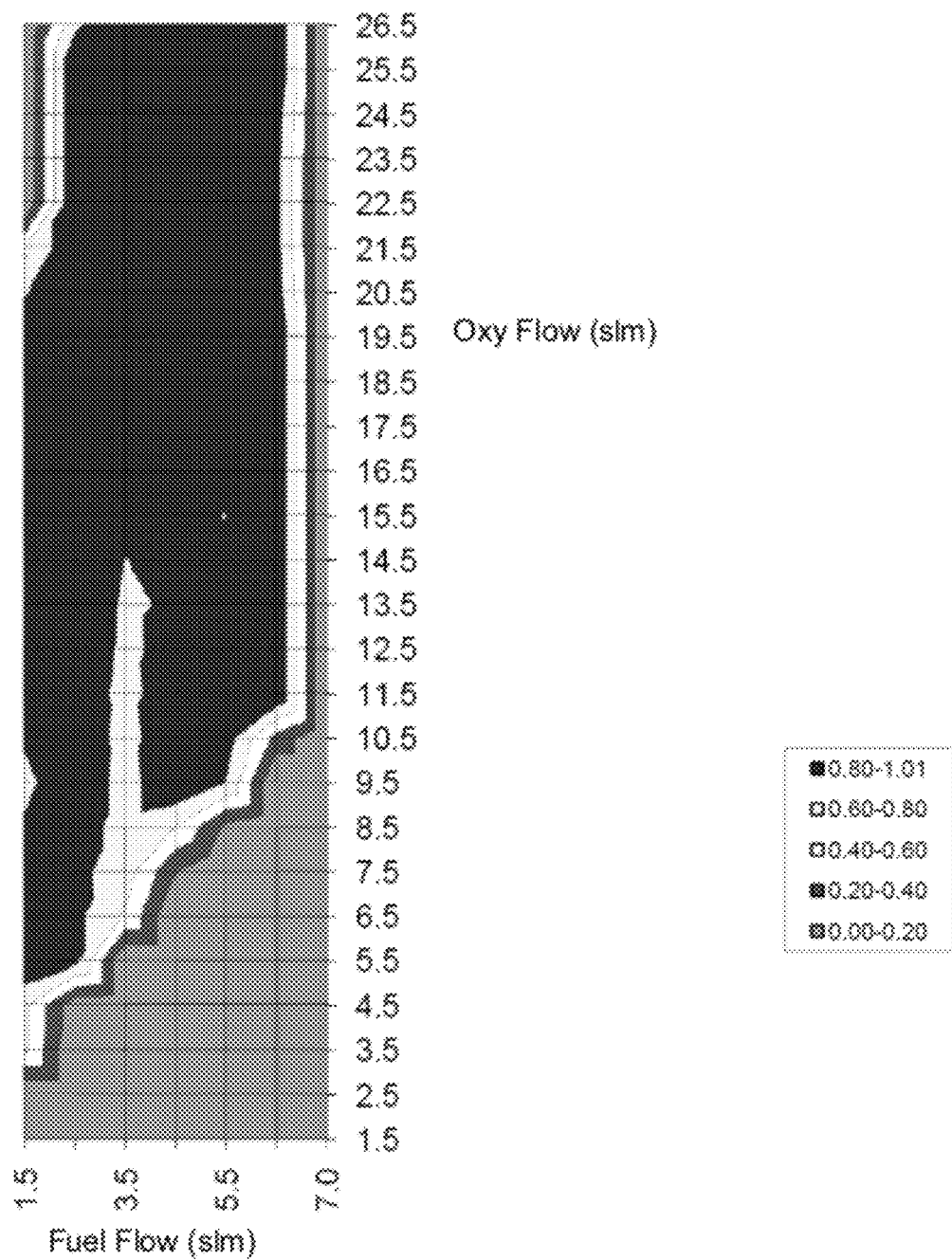

FIG. 8 another exemplary chart showing a relationship among the preheat oxygen flow, the fuel gas, and the start reliability achieved by the method of starting the auto-ignition gas torch based on the test data of Table 2;

FIG. 9 is another exemplary chart showing a relationship among the preheat oxygen flow, the fuel gas, and the start reliability achieved by the auto-ignition gas torch based on the test data of Table 3;

FIG. 10 is a further exemplary chart showing a relationship among the preheat oxygen flow, the fuel gas, and the start reliability achieved by the auto-ignition gas torch based on the test data of Table 4; and FIG. 11 is another exemplary chart showing a relationship among the preheat oxygen flow, the fuel gas flow, and the start reliability achieved by the method of starting the auto-ignition gas torch based on the test data of Table 5.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
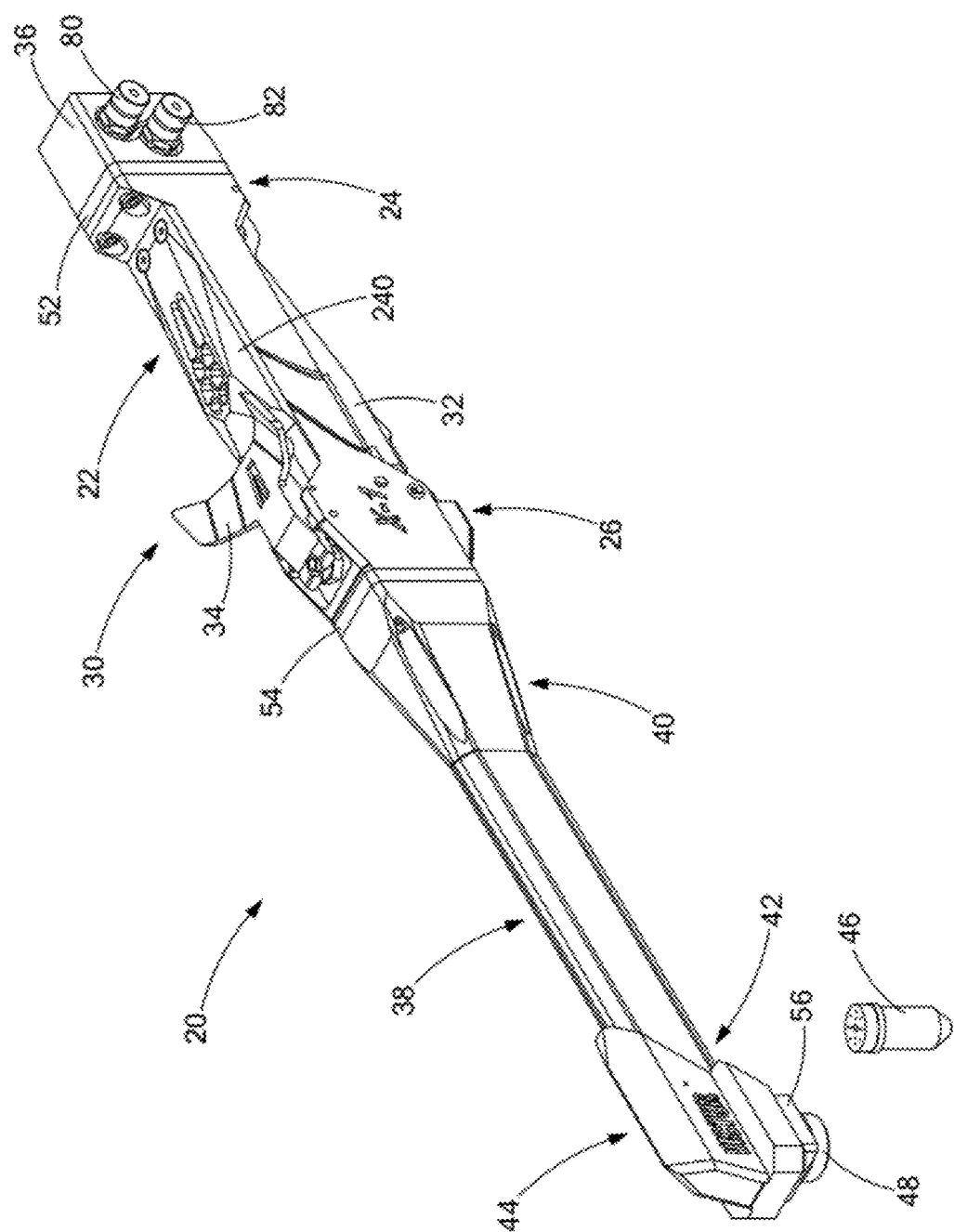
FIG. 1 is a perspective view of a gas cutting torch constructed in accordance with the principles of the present disclosure.
Figure 2:
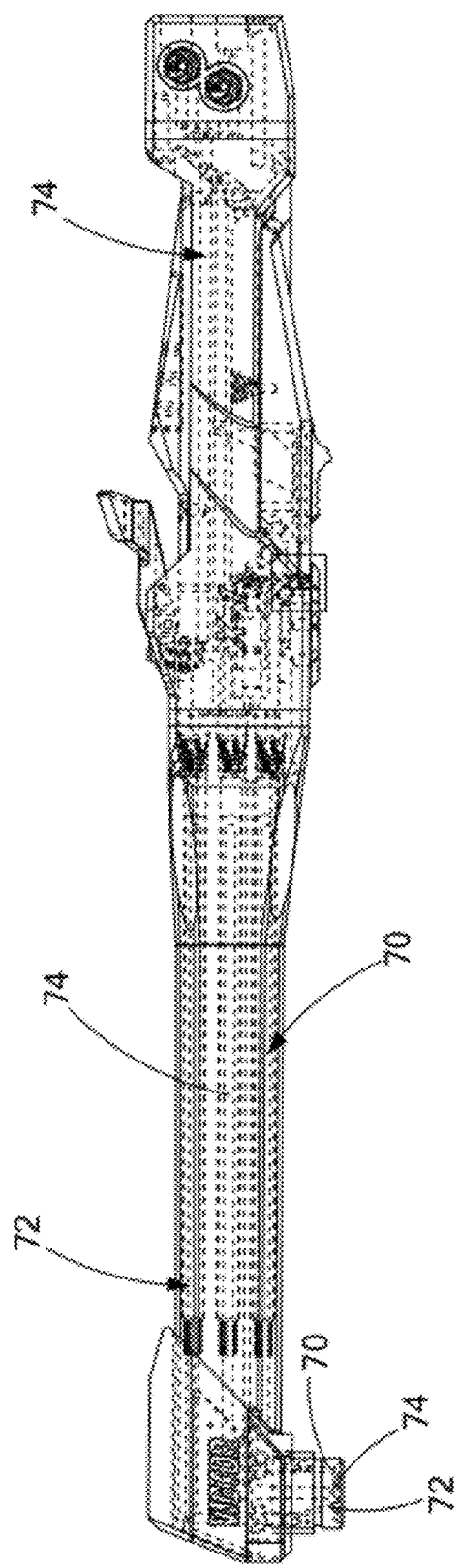
FIG. 2 is a side hidden line view illustrating various conduit arrays constructed in accordance with the principles of the present disclosure.

Referring to FIGS. 1-2, a gas cutting torch in accordance with the teachings of the present disclosure is illustrated and generally indicated by reference numeral 20. Although the term "cutting" is used throughout, it should be understood that the present disclosure applies generally to gas torches, such as those that heat and/or cut. Accordingly, the term "cutting" should not be construed to limit the scope of the present disclosure. The gas cutting torch 20 is an auto-ignition gas torch and comprises a handle portion 22, a trigger system 30 disposed along the handle portion 22, a gas flow control unit 36, a tube section 38, a head portion 44, and a cutting tip 46.

The handle portion 22 defines a proximal end portion 24 and a distal end portion 26. The gas flow control unit 36 is disposed at the proximal end portion 24 of the handle 22. The trigger system 30 is disposed along the handle portion 22 and comprises an ignition trigger 32 and a cutting oxygen trigger 34. The tube section 38 is disposed at the distal end portion 26 of the handle portion 22. The tube section 38 similarly defines a proximal end portion 40 and a distal end portion 42. The head portion 44 is disposed proximate the distal end portion 42 of the tube section 38. The cutting tip 46 is secured to the head portion 44 via a tip seat 48. The gas flow control unit 36 includes a preheat oxygen metering device 80 and a preheat fuel gas metering device 82 for metering the preheat oxygen and the fuel gas, respectively.

Referring to FIG. 2, the gas cutting torch 20 includes a preheat oxygen conduit array 70, a fuel gas conduit array 72, and a cutting oxygen conduit array 74 to direct the flow of preheat oxygen, fuel gas, and cutting oxygen, respectively. The preheat oxygen conduit array 70, the fuel gas conduit array 72, and the cutting oxygen conduit array 74 extend from the gas flow control unit 36, through various components in the gas cutting torch 20, through the tip seat 48, to the cutting tip 46. The gas flow control unit 36 is connected to an external oxygen source (not shown) and an external fuel gas source (not shown). The gas flow control unit 36 controls the flow rate of the preheat oxygen, the fuel gas, and the cutting oxygen from the external oxygen source and the external fuel gas source to the preheat oxygen conduit array 70, the fuel gas conduit array 72, and the cutting oxygen conduit array 74. A first gas control device 146 (shown in FIG. 3), and a second gas control device 148 (shown in FIG. 3) are disposed within the handle portion 22 and connected to the ignition trigger 32 to initiate flow of the preheat oxygen and the flow of fuel gas, respectively.

Figure 3:
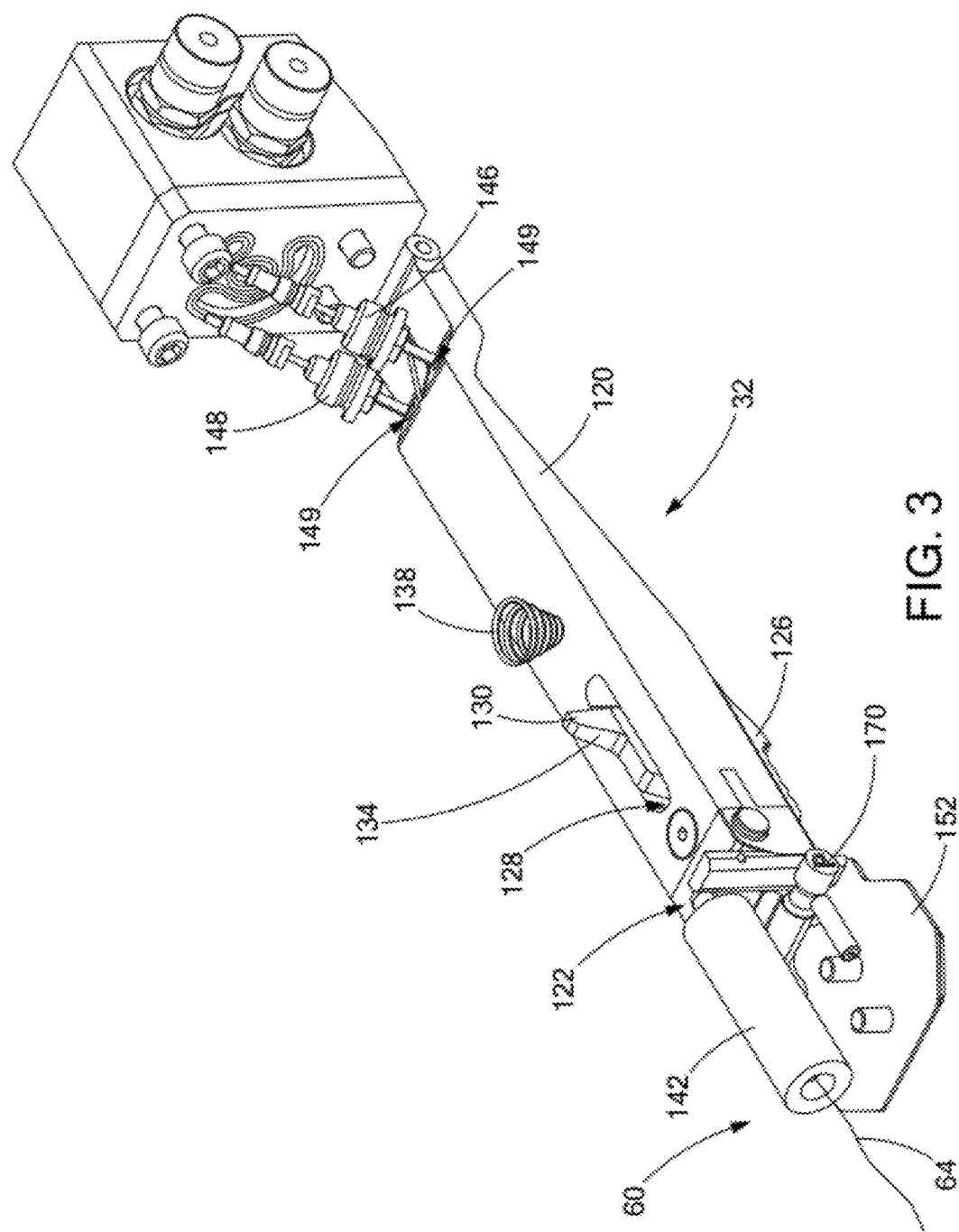
FIG. 3 is a partial perspective view illustrating an ignition trigger and gas control devices construed in accordance with the principles of the present disclosure.
Figure 4:
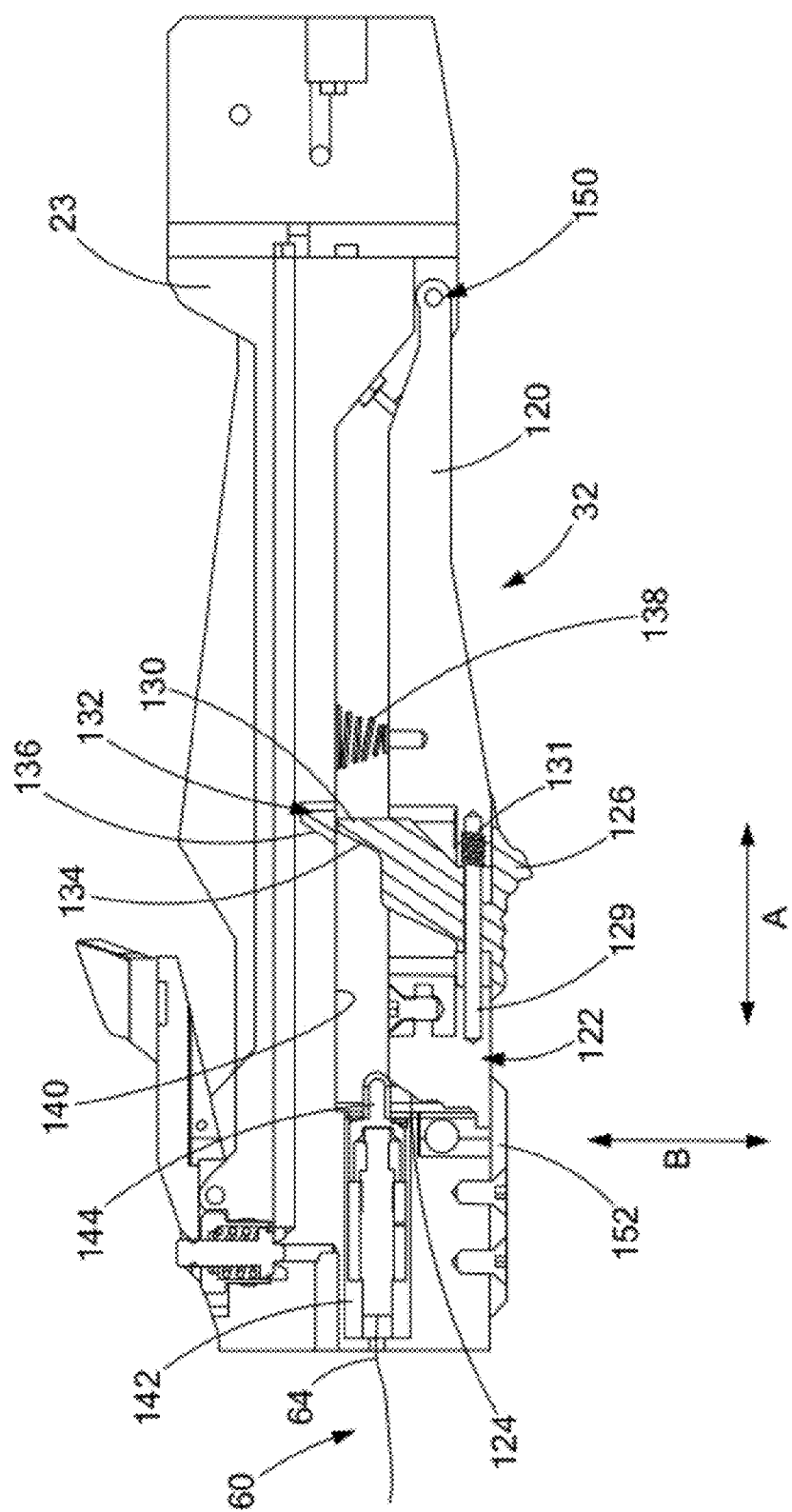
FIG. 4 is a cross-sectional view through a handle section, the ignition trigger, and a gas control device in accordance with the principles of the present disclosure.

Referring to FIGS. 3 and 4, an ignition system 60 is disposed within the gas cutting torch 20, and comprises a piezoelectric igniter 142 in communication with the ignition trigger 32 and an ignition wire 64 that extends from the piezoelectric igniter 142 to the cutting tip 46. The ignition trigger 32 comprises a trigger body 120, a latch 126, and a biasing device 138. The trigger body 120 includes a forward portion 122 defining a cam surface 124. The latch 126 is disposed within a groove 128 in the trigger body 120 and slidably engaged within the groove 128 along the direction of arrow A. The latch 126 includes an upper extension 130 defining a ramped surface 134. The ramped surface 134 cooperates with a corresponding ramped surface 136 of the cavity 132 in the "on" position. In the "off" position, the upper extension 130 abuts an inner surface 140 of the handle body 23 such that the trigger body 120 cannot be moved in the direction of arrow B and thus engage the ignition system 60.

The biasing device 138 is a coil spring which biases the ignition trigger 32 in the "off" position. The biasing device 138 abuts the inner surface 140 of the handle body 23 and the trigger body 120 and is biased to move the trigger body 120 downward, or to the "off" position. Therefore, it an operator releases the ignition trigger 32, the gas cutting torch 20 is turned off, or enters an "auto shut-off" mode, thus improving the safety of operation.

In operation, an operator slides the latch 126 back and pulls up on the trigger body 120. The trigger body 120 pivots about the hinge portion 150, and the internal receptacles 149 engage the gas control devices 146 and 148, and the flow of preheat oxygen and fuel gas are initiated. The forward portion 122 of the trigger body 120 engages the piezoelectric igniter 142 and an ignition source is generated, which travels down the length of the ignition wire 64 to the cutting tip 46 to start the gas cutting torch 20. The piezoelectric igniter 142 is further engaged within the ignition trigger 32, thus permitting operation of the cutting oxygen trigger 34, and the flow of cutting oxygen.

The ignition trigger 32 initiates the flow of preheat oxygen and fuel gas from the gas flow control unit 36 to the cutting tip 46, while also initiating ignition with a single motion by the operator. Therefore, the gas cutting torch 20 can advantageously be started with the use of only one-hand, or in other words, is configured for single-hand operation once the preheat oxygen and preheat fuel are properly set. When an operator releases the latch 126, the biasing device 138 forces the trigger body 120 back down to its neutral or "off" position. Therefore, the gas cutting torch 20 automatically shuts off when the ignition trigger 32 is released.

Figure 5:
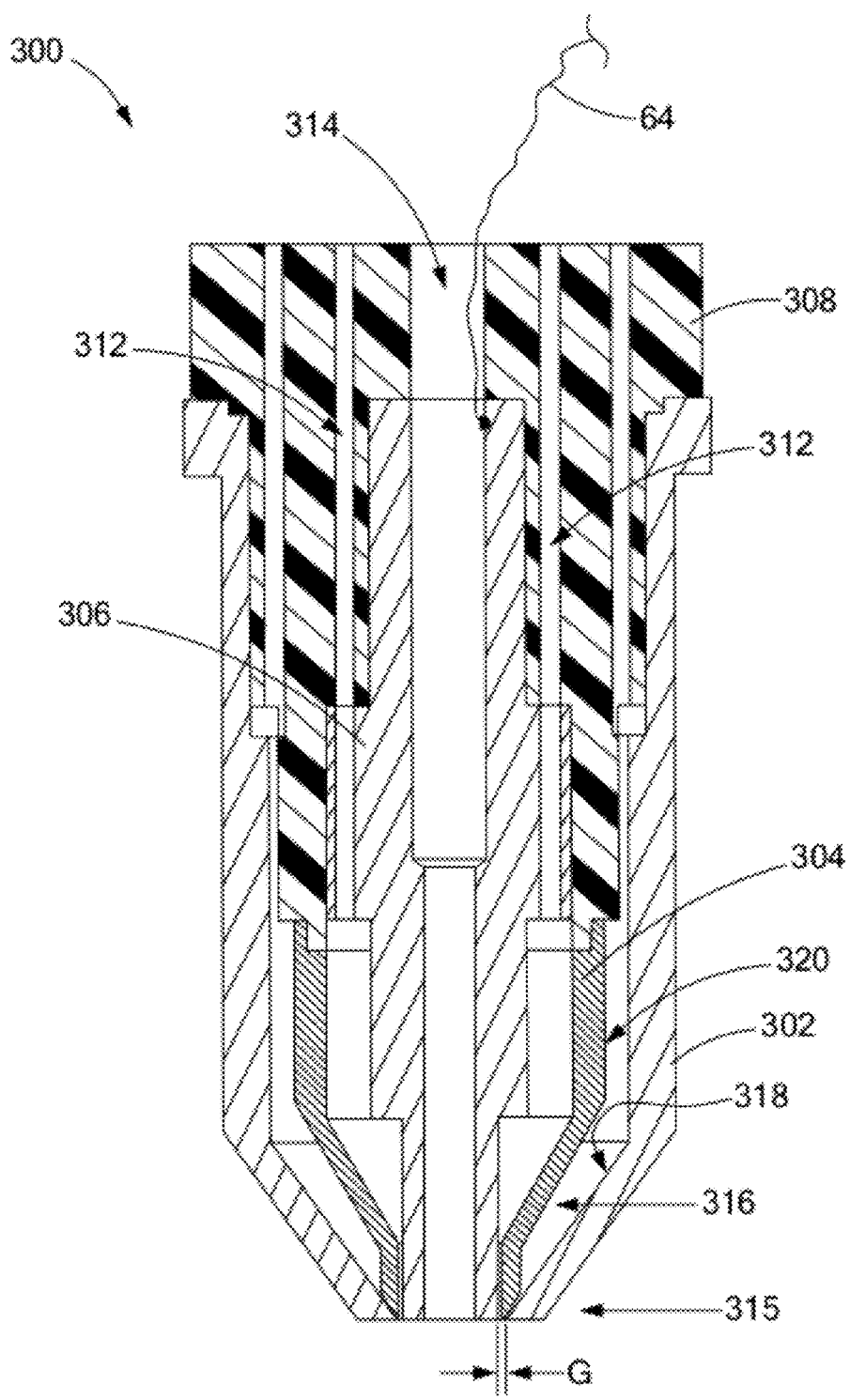
FIG. 5 is a cross-sectional view of a cutting tip in accordance with the principles of the present disclosure.

Referring to FIG. 5, the tip 46 includes an outer shell 302, a cap 304, an inner tube 306, and an insert 308. The cutting tip 46 defines a fuel gas passageway 312, a cutting oxygen gas passageway 314, and a preheat oxygen gas passageway 316. The fuel gas passageway 312 is a part of the fuel gas conduit array 72. The cutting oxygen gas passageway 314 is a part of the cutting oxygen conduit array 74. The preheat oxygen gas passageway 316 is a part of the preheat oxygen conduit array 70.

The ignition wire 64 from the ignition system 60 extends through the central cutting oxygen gas passageway 314 and is in electrical contact with the inner tube 306, which is conductive and thus generates the spark for ignition of the gas cutting torch 20. The spark is generated across a gap "G" between the inner tube 306 and the outer shell 302 at the distal end portion 315 of the cutting tip 46. In operation, the preheat oxygen, fuel gas, and cutting oxygen flow through separate gas conduct arrays are not mixed together until they meet at the distal end portion 315. Accordingly, the gases are mixed at the distal end portion 315 to provide the post-mix feature, while the spark is generated across the gap "G," thereby providing a safety feature and a convenience feature to the gas cutting torch 20.

Figure 6:
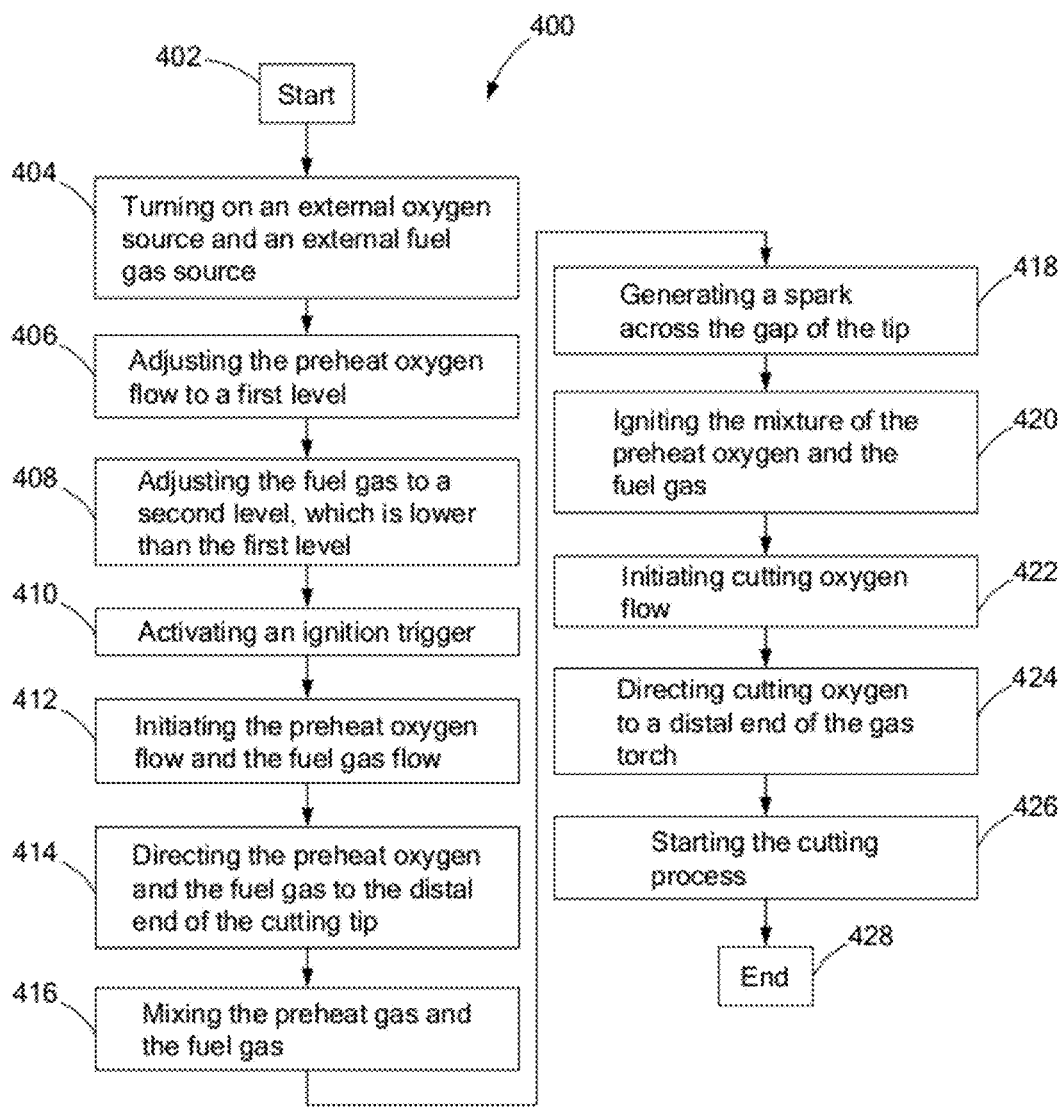
FIG. 6 is a flow diagram of a method of starting an auto-ignition gas torch in accordance with the principles of the present disclosure.

Referring to FIG. 6, a method of starting an auto-ignition gas torch according to the principles of the present disclosure is described below in more detail. The method 400 of starting an auto-ignition gas torch starts in step 402. An external oxygen source and an extern fuel gas source are turned on in step 404. The preheat oxygen gas flow (rate) is adjusted and increased to a first level in step 406. The preheat gas flow is adjusted by controlling the preheat oxygen metering device 80. Similarly, the fuel gas flow is adjusted and increased to a second level in step 408. The fuel gas flow is adjusted by controlling the fuel gas metering device 82. The first level is set to be higher than the second level so that an oxygen-rich mixture can be created at the distal end of the gas torch 20. The first level and the second level are determined based on the type of fuel gas used. Generally speaking, the flow of the preheat oxygen is an order of magnitude higher than a flow rate of fuel gas.

After the flow of the fuel gas and the flow of the preheat oxygen are adjusted according to a predetermined setting, the ignition trigger 32 is activated in step 410. Activation of the ignition trigger 32 also makes the internal receptacles 149 to engage the gas control devices 146 and 148. Therefore, the preheat oxygen flow and the fuel gas flow are initiated in step 412. The preheat oxygen flow and the fuel gas flow are directed from the gas flow control unit 36 to a distal end 315 of the tip 46 in step 414. The preheat oxygen flow and the fuel gas flow are mixed at the distal end 315 of the tip 46 in step 416. When the ignition trigger 32 is activated, a spark is generated across the gap G in step 418. As a result, the mixture of the preheat oxygen flow and the fuel gas flow is ignited to heat the workpiece in step 420.

Additionally, when the ignition trigger 32 is activated, the cutting oxygen trigger 34 is also activated to initiate the cutting oxygen flow in step 422. The cutting oxygen flow is also directed to the distal end 315 of the cutting tip 46 in step 424. When the cutting oxygen reacts with the heated workpiece, the cutting process is initiated in step 426. The method 400 ends in step 428.

The method 400 of starting an auto-ignition gas torch in accordance with the principles of the present disclosure creates an oxygen-rich mixture at a distal end 315 of the cutting tip 46. The oxygen-rich mixture results in a more reliable ignition for the auto-ignition gas torch that uses a piezoelectric igniter, as opposed to a prior art method which ignites a mixture of the fuel gas and oxygen is a highly carbonizing environment.

Referring to FIGS. 7-11, sample test data for the method 400 of starting the auto-ignition gas torch in accordance with the principles of the present disclosure and charts showing a relationship among the preheat oxygen flow, the fuel gas, and start reliability are explained in greater detail. It should be understood that the test data illustrated herein is merely exemplary and should not be construed as limiting the scope of the present disclosure.

All of the tests were conducted under conditions where the oxygen regulator pressure was about 30 psig and the fuel gas pressure was about 12 psig. More specifically, when the fuel gas is acetylene, the preheat oxygen flow is from about two times to about six times higher than the fuel gas flow. For example, the flow of the preheat oxygen may be set to be from about 10 SCFH to about 22 SCFH. The flow of fuel gas is from about 1.5 SCFH to about 4 SCFH. (SCFH is a measurement of fluid flow rate and stands for standard cubic feet per hour). When the fuel gas is propane, the flow of the preheat oxygen is from about 7 SCFH to about 27 SCFH, and the flow of fuel gas is from about 1.5 SCFH to about 9.5 SCFH.

Figure 7:
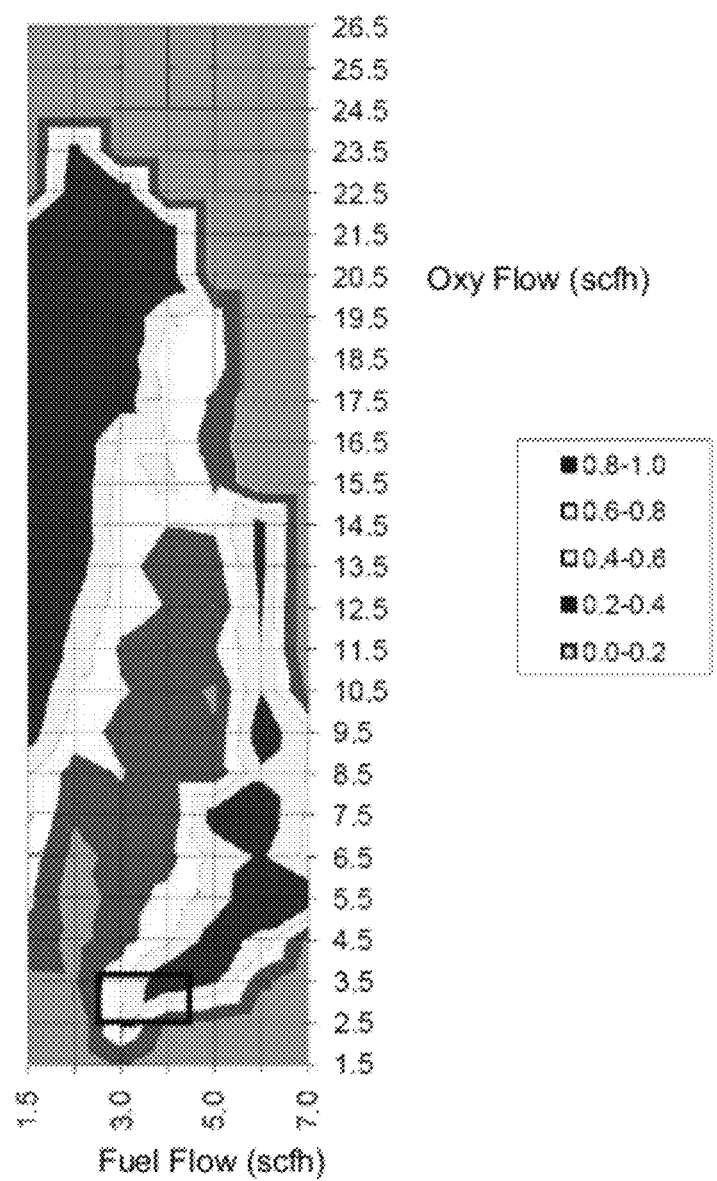
FIG. 7 is an exemplary chart showing a relationship among the preheat oxygen flow, the fuel gas, and the start reliability achieved by the method of starting the auto-ignition gas torch, based on the test data of Table 1.

As shown in FIG. 7 and Table 1 below, when the fuel gas is acetylene, the oxygen flow can range from approximately 3.2 SCFH or 1.5 standard liters per minute (slm) to 49.4 SCFH (or 24 slm), whereas the fuel gas flow can range from 6.3 SCFH (or 3.0 slm) to 14.7 SCFH (or 7 slm). The pilot reliability or start reliability can range from about 14% to about 100%. Start reliability may be determined, for example, based on the non-occurrence of flame burn back, sustenance of torch flame, whether the gas torch can achieve maximum delivery at 12 psig without adversely affecting the flame, and when oxygen over-powers the fuel gas, among others. For example, the start reliability of about 14% may occur when the fuel flow is about 14.7 SCFH and the oxygen flow is about 22.1 SCFH. To increase start reliability, the fuel flow may be reduced while the same preheat oxygen flow is maintained. When the fuel flow is reduced to be approximately 3.2 SCFH, the start reliability can reach 100%.

TABLE 1

| Pilot Reliability | | | 3.2 | 5.3 | 7.4 | 9.5 | 11.6 | 13.7 | 15.8 | 17.9 | 20.0 |
|---|---|---|---|---|---|---|---|---|---|---|---|
| | scfh | slm | 1.5 | 2.5 | 3.5 | 4.5 | 5.5 | 6.5 | 7.5 | 8.5 | 9.5 |
| Fuel Flow | 3.2 | 1.5 | | | | 0.14 $^a$ | 0.35 | 0.45 | 0.52 | 0.65 | 0.65 | 0.93 |
| | 4.2 | 2.0 | | | | 0.17 $^a$ | 0.13 $^a$ | 0.07 | 0.14 | 0.22 | 0.31 | 0.50 |
| | 6.3 | 3.0 | 0.23 | 0.63 | 0.54 | 0.31 | 0.30 | 0.26 | 0.35 | 0.42 | 0.34 |
| | 8.4 | 4.0 | | 0.17 | 1.00 | 0.56 | 0.47 | 0.32 | 0.21 | 0.25 | 0.25 |
| | 10.5 | 5.0 | | 0.15 | 0.83 | 0.91 | 0.69 | 0.67 | 0.91 | 0.25 | 0.22 |
| | 12.6 | 6.0 | | | 0.25 | 0.74 | 1.00 | 0.83 | 0.95 | 0.77 | 0.95 |
| | 14.7 | 7.0 | | | | 0.14 | 1.00 | 0.54 | 0.57 | 0.59 | 0.61 |
| | 16.8 | 8.0 | | | | | | | | | |
| | 18.9 | 9.0 | | | | | | | | | |

| Pilot Reliability | | | 22.1 | 24.2 | 26.3 | 28.4 | 30.5 | 32.6 | 34.7 | 36.8 | 38.9 |
|---|---|---|---|---|---|---|---|---|---|---|---|
| | scfh | slm | 10.5 | 11.5 | 12.5 | 13.5 | 14.5 | 15.5 | 16.5 | 17.5 | 18.5 |
| Fuel Flow | 3.2 | 1.5 | 1.00 | 1.00 | 1.00 | 1.00 | 1.00 | 1.00 | 1.00 | 1.00 | 1.00 |
| | 4.2 | 2.0 | 0.59 | 0.74 | 0.80 | 0.91 | 1.00 | 1.00 | 1.00 | 0.91 | 1.00 |
| | 6.3 | 3.0 | 0.42 | 0.37 | 0.50 | 0.52 | 0.48 | 0.50 | 0.58 | 0.92 | 1.00 |
| | 8.4 | 4.0 | 0.32 | 0.27 | 0.38 | 0.23 | 0.41 | 0.65 | 0.58 | 0.54 | 0.45 |
| | 10.5 | 5.0 | 0.16 | 0.39 | 0.19 | 0.29 | 0.44 | 0.38 | 0.29 | 0.37 | 0.53 |
| | 12.6 | 6.0 | 0.80 | 0.80 | 0.83 | 0.87 | 0.87 | | | | |
| | 14.7 | 7.0 | 0.14 | | | | | | | | |
| | 16.8 | 8.0 | | | | | | | | | |
| | 18.9 | 9.0 | | | | | | | | | |

| Pilot Reliability | | | 41.0 | 43.1 | 45.2 | 47.3 | 49.4 | 51.5 | 53.6 | 55.7 |
|---|---|---|---|---|---|---|---|---|---|---|
| | scfh | slm | 19.5 | 20.5 | 21.5 | 22.5 | 23.5 | 24.5 | 25.5 | 26.5 |
| Fuel Flow | 3.2 | 1.5 | 1.00 | 1.00 | 1.00 | $^d$ | | | | |
| | 4.2 | 2.0 | 1.00 | 1.00 | 0.91 | 1.00 | 0.91 | $^c$ | | |
| | 6.3 | 3.0 | 1.00 | 1.00 | 1.00 | 1.00 | $^c$ | | | |
| | 8.4 | 4.0 | 0.63 | 1.00 | 1.00 | $^c$ | | | | |
| | 10.5 | 5.0 | 0.50 | $^c$ | | | | | | |

TABLE 1-continued

| | |
|---|---|
| 12.6 | 6.0 |
| 14.7 | 7.0 |
| 16.8 | 8.0 |
| 18.9 | 9.0 |

Superscript "a" indicates a situation where burn-back occurs, superscript "b" indicates a situation where too much oxygen is present to sustain the flame, superscript "c" indicates a situation where the gas torch can achieve maximum delivery at 12 psig without adversely affecting the flame, superscript "d" indicates a situation where oxygen over-powers the fuel gas.

As shown in FIG. 8 and Table 2 below, in another test where the fuel gas is acetylene, the preheat oxygen flow can range from about 3.2 SCFH (or 1.5 slm) to about 55.7 (or 26.5 slm) and the fuel gas flow can range from about 3.2 SCFH (or 1.5 slm) to about 34.7 SCFH (or 16.5 slm). The start reliability ranges from about 10% to about 100%.

TABLE 2

| | | | \multicolumn{9}{c}{Oxygen Flow} | | | | | | | | |
|---|---|---|---|---|---|---|---|---|---|---|---|
| | Pilot Reliability | | 3.2 | 5.3 | 7.4 | 9.5 | 11.6 | 13.7 | 15.8 | 17.9 | 20.0 |
| | scfh | | 1.5 | 2.5 | 3.5 | 4.5 | 5.5 | 6.5 | 7.5 | 8.5 | 9.5 |
| Fuel | 3.2 | 1.5 | | | | | | | | 0.14 | 0.24 |
| Flow | 5.3 | 2.5 | | | | | | | | | |
| | 7.4 | 3.5 | | 0.29 | 1.00 | 0.77 | 0.53 | 0.30 | 0.15 | 0.01 | 0.01 |
| | 9.5 | 4.5 | | 0.12 | 0.50 | 0.71 | 0.81 | 0.91 | 0.75 | 0.59 | 0.56 |
| | 11.6 | 5.5 | 0.26 | 0.83 | 0.91 | 1.00 | 1.00 | 1.00 | 0.78 | 0.56 | 0.46 |
| | 13.7 | 6.5 | 0.17 | 0.50 | 1.00 | 1.00 | 1.00 | 1.00 | 1.00 | 1.00 | 0.79 |
| | 15.8 | 7.5 | 0.17 | 0.38 | 0.59 | 1.00 | 1.00 | 1.00 | 1.00 | 1.00 | 1.00 |
| | 17.9 | 8.5 | 0.61 | 0.91 | 1.00 | 0.91 | 0.95 | 1.00 | 1.00 | 1.00 | 1.00 |
| | 20.0 | 9.5 | | 0.12 | 0.67 | 0.83 | 0.92 | 1.00 | 1.00 | 1.00 | 1.00 |
| | 22.1 | 10.5 | 0.10 | 0.23 | 0.45 | 0.77 | 0.88 | 1.00 | 1.00 | 1.00 | 1.00 |
| | 24.2 | 11.5 | | | 0.21 | 0.50 | 0.61 | 0.71 | 0.86 | 1.00 | 1.00 |
| | 26.3 | 12.5 | | | 0.29 | 0.58 | 0.74 | 0.91 | 0.91 | 0.91 | 0.95 |
| | 28.4 | 13.5 | | | 0.04 | 0.67 | 0.83 | 1.00 | 1.00 | 1.00 | 1.00 |
| | 30.5 | 14.5 | | | | 0.18 | 0.38 | 0.59 | 0.79 | 1.00 | 1.00 |
| | 32.6 | 15.5 | | | | | | 0.77 | 0.88 | 1.00 | 0.95 |
| | 34.7 | 16.5 | | | | | | | | 0.91 | 0.95 |

| | | | \multicolumn{7}{c}{Oxygen Flow} | | | | | |
|---|---|---|---|---|---|---|---|---|---|
| | Pilot Reliability | | 22.1 | 24.2 | 26.3 | 28.4 | 30.5 | 32.6 | 34.7 | 36.8 |
| | scfh | | 10.5 | 11.5 | 12.5 | 13.5 | 14.5 | 15.5 | 16.5 | 17.5 |
| Fuel | 3.2 | 1.5 | 0.34 | 0.40 | 0.45 | 0.61 | 0.77 | 0.84 | 0.91 | 0.87 |
| Flow | 5.3 | 2.5 | 0.20 | 0.32 | 0.44 | 0.48 | 0.52 | 0.55 | 0.58 | 0.66 |
| | 7.4 | 3.5 | 0.01 | 0.11 | 0.21 | 0.36 | 0.50 | 0.63 | 0.77 | 0.80 |
| | 9.5 | 4.5 | 0.53 | 0.43 | 0.33 | 0.48 | 0.63 | 0.81 | 1.00 | 1.00 |
| | 11.6 | 5.5 | 0.37 | 0.54 | 0.71 | 0.86 | 1.00 | 0.95 | 0.91 | 0.91 |
| | 13.7 | 6.5 | 0.59 | 0.52 | 0.45 | 0.58 | 0.71 | 0.74 | 0.77 | 0.74 |
| | 15.8 | 7.5 | 1.00 | 1.00 | 1.00 | 0.83 | 0.67 | 0.60 | 0.53 | 0.76 |
| | 17.9 | 8.5 | 1.00 | 0.81 | 0.63 | 0.56 | 0.50 | 0.49 | 0.48 | 0.62 |
| | 20.0 | 9.5 | 1.00 | 1.00 | 1.00 | 0.83 | 0.67 | 0.53 | 0.40 | 0.56 |
| | 22.1 | 10.5 | 1.00 | 0.92 | 0.83 | 0.77 | 0.71 | 0.69 | 0.67 | 0.72 |
| | 24.2 | 11.5 | 1.00 | 1.00 | 1.00 | 1.00 | 1.00 | 0.88 | 0.77 | 0.88 |
| | 26.3 | 12.5 | 1.00 | 1.00 | 1.00 | 1.00 | 1.00 | 0.95 | 0.91 | 0.87 |
| | 28.4 | 13.5 | 1.00 | 1.00 | 1.00 | 1.00 | 1.00 | 1.00 | 1.00 | 1.00 |
| | 30.5 | 14.5 | 1.00 | 1.00 | 1.00 | 0.88 | 0.77 | 0.84 | 0.91 | 0.95 |
| | 32.6 | 15.5 | 0.91 | 0.95 | 1.00 | 1.00 | 1.00 | 1.00 | 1.00 | 1.00 |
| | 34.7 | 16.5 | 1.00 | 1.00 | 1.00 | 1.00 | 1.00 | 1.00 | 1.00 | 1.00 |

| | | | \multicolumn{8}{c}{Oxygen Flow} | | | | | | |
|---|---|---|---|---|---|---|---|---|---|---|
| | Pilot Reliability | | 38.9 | 41.0 | 43.1 | 45.2 | 47.3 | 49.4 | 51.5 | 53.6 | 55.7 |
| | scfh | | 18.5 | 19.5 | 20.5 | 21.5 | 22.5 | 23.5 | 24.5 | 25.5 | 26.5 |
| Fuel | 3.2 | 1.5 | 0.83 | 0.92 | 1.00 | 1.00 | 1.00 | 1.00 | 1.00 | 1.00 | 1.00 |
| Flow | 5.3 | 2.5 | 0.73 | 0.76 | 0.79 | 0.85 | 0.92 | 0.96 | 1.00 | 1.00 | 1.00 |
| | 7.4 | 3.5 | 0.83 | 0.80 | 0.77 | 0.84 | 0.91 | 0.91 | 0.91 | 0.95 | 1.00 |
| | 9.5 | 4.5 | 1.00 | 0.88 | 0.77 | 0.84 | 0.91 | 0.95 | 1.00 | 1.00 | 1.00 |
| | 11.6 | 5.5 | 0.91 | 0.95 | 1.00 | 1.00 | 1.00 | 0.92 | 0.83 | 0.92 | 1.00 |
| | 13.7 | 6.5 | 0.71 | 0.86 | 1.00 | 1.00 | 1.00 | 0.95 | 0.91 | 0.95 | 1.00 |
| | 15.8 | 7.5 | 1.00 | 0.95 | 0.91 | 0.95 | 1.00 | 1.00 | 1.00 | 1.00 | 1.00 |
| | 17.9 | 8.5 | 0.77 | 0.88 | 1.00 | 1.00 | 1.00 | 1.00 | 1.00 | 1.00 | 1.00 |
| | 20.0 | 9.5 | 0.71 | 0.77 | 0.83 | 0.87 | 0.91 | 0.91 | 0.91 | 0.95 | 1.00 |
| | 22.1 | 10.5 | 0.77 | 0.84 | 0.91 | 0.95 | 1.00 | 1.00 | 1.00 | 1.00 | 1.00 |
| | 24.2 | 11.5 | 1.00 | 0.83 | 0.67 | 0.79 | 0.91 | 0.91 | 0.91 | 0.91 | 0.91 |

TABLE 2-continued

| | | | | | | | | | | |
|---|---|---|---|---|---|---|---|---|---|---|
| 26.3 | 12.5 | 0.83 | 0.92 | 1.00 | 0.95 | 0.91 | 0.68 | 0.45 | 0.73 | 1.00 |
| 28.4 | 13.5 | 1.00 | 0.95 | 0.91 | 0.73 | 0.56 | 0.56 | 0.56 | 0.73 | 0.91 |
| 30.5 | 14.5 | 1.00 | 0.95 | 0.91 | 0.84 | 0.77 | | | | |
| 32.6 | 15.5 | 1.00 | 1.00 | 1.00 | | | | | | |
| 34.7 | 16.5 | 1.00 | 0.50 | | | | | | | |

As shown in FIG. 9 and Table 3 below, when the fuel gas is propane, the preheat oxygen flow can range from about 3.0 slm to about 27.0 slm, whereas the fuel flow can range from about 1.5 slm to about 5.0 slm. The start reliability can range from about 14% to about 100%.

TABLE 3

| | | Oxygen Flow (slm) | | | | | | | | |
|---|---|---|---|---|---|---|---|---|---|---|
| Pilot Reliability | | 2.0 | 3.0 | 4.0 | 5.0 | 6.0 | 7.0 | 8.0 | 9.0 | 10.0 |
| Fuel | 1.5 | | 0.95 | 0.56 | 0.71 | 1.00 | 1.00 | 1.00 | 1.00 | 1.00 |
| Flow | 2.0 | | | | 0.83 | 0.25 | 0.93 | 1.00 | 1.00 | 0.93 |
| (slm) | 3.0 | | | | | 0.49 | 0.83 | 0.77 | 0.36 | 0.61 |
| | 4.0 | | | | | | | | | 0.14 |
| | 5.0 | | | | | | | | | |
| | 5.5 | | | | | | | | | |
| | 6.0 | | | | | | | | | |
| | 6.5 | | | | | | | | | |
| | 7.0 | | | | | | | | | |

| | | Oxygen Flow (slm) | | | | | | | |
|---|---|---|---|---|---|---|---|---|---|
| Pilot Reliability | | 11.0 | 12.0 | 13.0 | 14.0 | 15.0 | 16.0 | 17.0 | 18.0 |
| Fuel | 1.5 | 1.00 | 1.00 | 1.00 | 1.00 | 1.00 | 1.00 | 1.00 | 1.00 |
| Flow | 2.0 | 1.00 | 0.93 | 1.00 | 1.00 | 1.00 | 0.81 | 1.00 | 0.87 |
| (slm) | 3.0 | 0.94 | 1.00 | 1.00 | 0.92 | 1.00 | 1.00 | 1.00 | 0.88 |
| | 4.0 | 0.38 | 1.00 | 1.00 | 1.00 | 1.00 | 1.00 | 1.00 | 1.00 |
| | 5.0 | | 0.28 | 0.42 | 0.80 | 0.8 | 0.57 | 0.8 | 0.92 |
| | 5.5 | | | | | | | | |
| | 6.0 | | | | | | | | |
| | 6.5 | | | | | | | | |
| | 7.0 | | | | | | | | |

| | | Oxygen Flow (slm) | | | | | | | |
|---|---|---|---|---|---|---|---|---|---|
| Pilot Reliability | | 19.0 | 20.0 | 21.0 | 22.0 | 23.0 | 24.0 | 25.0 | 26.0 | 27.0 |
| Fuel | 1.5 | 1.00 | 0.92 | 1.00 | 1.00 | 1.00 | 1.00 | 1.00 | 1.00 | 0.60 |
| Flow | 2.0 | 1.00 | 0.93 | 1.00 | 1.00 | 1.00 | 1.00 | 1.00 | 1.00 | $d$ |
| (slm) | 3.0 | 1.00 | 1.00 | 1.00 | 0.92 | 0.92 | | | | |
| | 4.0 | 1.00 | 1.00 | 1.00 | 0.27 | | | | | |
| | 5.0 | 0.43 | 0.71 | | | | | | | |
| | 5.5 | | | | | | | | | |
| | 6.0 | | | | | | | | | |
| | 6.5 | | | | | | | | | |
| | 7.0 | | | | | | | | | |

Superscript "d" indicates a situation where oxygen over-powers the fuel gas.

As shown in FIG. 10 and Table 4 below, in another test where the fuel gas is propane, the oxygen flow can range from about 7.4 SCFH to about 55.7 SCFH, whereas the fuel gas flow can range from about 3.2 SCFH (1.5 slm) to about 22.1 SCFH (10.5 slm). The start reliability is from about 4% to about 100%. For example, when the fuel flow rate is about 7.4 SCFH (3.5 slm) and the oxygen flow is about 11.6 SCFH (5.5), the gas torch achieve a start reliability of about 17%. When the oxygen flow is increased to about 13.7, the start reliability is significantly increased from about 17% to about 100%. When the preheat oxygen flow continues to be increased, the start reliability is maintained at about 100%. The oxygen flow is about two times the fuel gas flow or at least an order of a magnitude higher than the fuel gas flow to achieve about 100% start reliability.

TABLE 4

| Pilot Reliability | | Oxygen Flow | | | | | | | |
|---|---|---|---|---|---|---|---|---|---|
|  |  | 3.2 | 5.3 | 7.4 | 9.5 | 11.6 | 13.7 | 15.8 | 17.9 | 20.0 |
|  | scfh | 1.5 | 2.5 | 3.5 | 4.5 | 5.5 | 6.5 | 7.5 | 8.5 | 9.5 |
| Fuel Flow | 3.2 / 1.5 |  |  | 0.85 | 0.79 | 0.72 | 0.65 | 0.60 | 0.55 | 0.62 |
|  | 5.3 / 2.5 |  |  | 0.04 | 0.48 | 1.00 | 1.00 | 1.00 | 1.00 | 0.88 |
|  | 7.4 / 3.5 |  |  |  |  | 0.17 | 1.00 | 1.00 | 1.00 | 1.00 |
|  | 9.5 / 4.5 |  |  |  |  |  |  | 0.09 | 0.83 | 0.80 |
|  | 11.6 / 5.5 |  |  |  |  |  |  |  |  |  |
|  | 13.7 / 6.5 |  |  |  |  |  |  |  |  |  |
|  | 15.8 / 7.5 |  |  |  |  |  |  |  |  |  |
|  | 17.9 / 8.5 |  |  |  |  |  |  |  |  |  |
|  | 20.0 / 9.5 |  |  |  |  |  |  |  |  |  |
|  | 22.1 / 10.5 |  |  |  |  |  |  |  |  |  |
|  | 24.2 / 11.5 |  |  |  |  |  |  |  |  |  |
|  | 26.3 / 12.5 |  |  |  |  |  |  |  |  |  |
|  | 28.4 / 13.5 |  |  |  |  |  |  |  |  |  |
|  | 30.5 / 14.5 |  |  |  |  |  |  |  |  |  |
|  | 32.6 / 15.5 |  |  |  |  |  |  |  |  |  |
|  | 34.7 / 16.5 |  |  |  |  |  |  |  |  |  |

| Pilot Reliability | | Oxygen Flow | | | | | | | |
|---|---|---|---|---|---|---|---|---|---|
|  |  | 22.1 | 24.2 | 26.3 | 28.4 | 30.5 | 32.6 | 34.7 | 36.8 |
|  | scfh | 10.5 | 11.5 | 12.5 | 13.5 | 14.5 | 15.5 | 16.5 | 17.5 |
| Fuel Flow | 3.2 / 1.5 | 0.69 | 0.58 | 0.48 | 0.54 | 0.61 | 0.73 | 0.85 | 0.88 |
|  | 5.3 / 2.5 | 0.77 | 0.80 | 0.83 | 0.75 | 0.67 | 0.83 | 1.00 | 1.00 |
|  | 7.4 / 3.5 | 1.00 | 1.00 | 1.00 | 1.00 | 1.00 | 1.00 | 1.00 | 1.00 |
|  | 9.5 / 4.5 | 0.77 | 0.80 | 0.83 | 0.92 | 1.00 | 1.00 | 1.00 | 0.95 |
|  | 11.6 / 5.5 | 0.83 | 0.87 | 0.91 | 0.95 | 1.00 | 0.88 | 0.77 | 0.74 |
|  | 13.7 / 6.5 |  | 0.24 | 0.67 | 0.65 | 0.63 | 0.81 | 1.00 | 0.86 |
|  | 15.8 / 7.5 |  |  |  |  | 0.71 | 0.67 | 0.63 | 0.81 |
|  | 17.9 / 8.5 |  |  |  |  | 0.08 | 0.17 | 0.25 | 0.36 |
|  | 20.0 / 9.5 |  |  |  |  |  |  |  |  |
|  | 22.1 / 10.5 |  |  |  |  |  |  |  |  |
|  | 24.2 / 11.5 |  |  |  |  |  |  |  |  |
|  | 26.3 / 12.5 |  |  |  |  |  |  |  |  |
|  | 28.4 / 13.5 |  |  |  |  |  |  |  |  |
|  | 30.5 / 14.5 |  |  |  |  |  |  |  |  |
|  | 32.6 / 15.5 |  |  |  |  |  |  |  |  |
|  | 34.7 / 16.5 |  |  |  |  |  |  |  |  |

| Pilot Reliability | | Oxygen Flow | | | | | | | |
|---|---|---|---|---|---|---|---|---|---|
|  |  | 38.9 | 41.0 | 43.1 | 45.2 | 47.3 | 49.4 | 51.5 | 53.6 | 55.7 |
|  | scfh | 18.5 | 19.5 | 20.5 | 21.5 | 22.5 | 23.5 | 24.5 | 25.5 | 26.5 |
| Fuel Flow | 3.2 / 1.5 | 0.92 | 0.96 | 1.00 | 1.00 | 1.00 | 1.00 | 1.00 | 0.69 | 0.37 |
|  | 5.3 / 2.5 | 1.00 | 1.00 | 1.00 | 1.00 | 1.00 | 1.00 | 1.00 | 1.00 | 1.00 |
|  | 7.4 / 3.5 | 1.00 | 1.00 | 1.00 | 1.00 | 1.00 | 1.00 | 1.00 | 1.00 | 1.00 |
|  | 9.5 / 4.5 | 0.91 | 0.95 | 1.00 | 1.00 | 1.00 | 1.00 | 1.00 | 1.00 | 1.00 |
|  | 11.6 / 5.5 | 0.71 | 0.77 | 0.83 | 0.83 | 0.83 | 0.92 | 1.00 | 1.00 | 1.00 |
|  | 13.7 / 6.5 | 0.71 | 0.74 | 0.77 | 0.80 | 0.83 | 0.87 | 0.91 | 0.95 | 1.00 |
|  | 15.8 / 7.5 | 1.00 | 1.00 | 1.00 | 1.00 | 1.00 | 1.00 | 1.00 | 1.00 | 1.00 |
|  | 17.9 / 8.5 | 0.48 | 0.74 | 1.00 | 1.00 | 1.00 | 0.95 | 0.91 | 0.81 | 0.71 |
|  | 20.0 / 9.5 | 0.07 | 0.39 | 0.71 | 0.71 | 0.71 | 0.81 | 0.91 | 0.95 | 1.00 |
|  | 22.1 / 10.5 |  |  | 0.17 | 0.58 | 1.00 | 1.00 | 1.00 |  |  |
|  | 24.2 / 11.5 |  |  |  |  |  |  |  |  |  |
|  | 26.3 / 12.5 |  |  |  |  |  |  |  |  |  |
|  | 28.4 / 13.5 |  |  |  |  |  |  |  |  |  |
|  | 30.5 / 14.5 |  |  |  |  |  |  |  |  |  |
|  | 32.6 / 15.5 |  |  |  |  |  |  |  |  |  |
|  | 34.7 / 16.5 |  |  |  |  |  |  |  |  |  |

As shown in FIG. 11 and Table 5 below, when the fuel gas is methane, the preheat oxygen flow is from about 3.5 slm to about 26.5 slm, whereas the fuel flow is from about 1.5 slm to about 6.5 slm. The start reliability is from about 21% to about 100%.

TABLE 5

| Pilot Reliability | | Oxygen Flow (slm) | | | | | | | | |
|---|---|---|---|---|---|---|---|---|---|---|
| | | 1.5 | 2.5 | 3.5 | 4.5 | 5.5 | 6.5 | 7.5 | 8.5 | 9.5 | 10.5 |
| Fuel Flow (slm) | 1.5 | | | 0.63 | 0.63 | 1.00 | 0.96 $^d$ | 0.92 | 0.83 $^d$ | 0.74 | 0.83 $^d$ |
| | 2.5 | | | | 0.08 | 0.87 | 0.86 $^d$ | 0.86 | 0.92 | 1.00 | 0.96 $^d$ |
| | 3.5 | | | | | | 0.58 | 0.71 | 0.71 $^d$ | 0.71 | 0.73 $^d$ |
| | 4.5 | | | | | | | 0.21 | 0.61 $^d$ | 1.00 | 0.95 $^d$ |
| | 5.5 | | | | | | | | 0.16 | 0.80 | 0.90 $^d$ |
| | 6.5 | | | | | | | | | | 0.32 |
| | 7.0 | | | | | | | | | | |
| | 7.5 | | | | | | | | | | |
| | 8.0 | | | | | | | | | | |
| | 8.5 | | | | | | | | | | |
| | 9.0 | | | | | | | | | | |
| | 9.5 | | | | | | | | | | |

| Pilot Reliability | | Oxygen Flow (slm) | | | | | | | |
|---|---|---|---|---|---|---|---|---|---|
| | | 11.5 | 12.5 | 13.5 | 14.5 | 15.5 | 16.5 | 17.5 | 18.5 |
| Fuel Flow (slm) | 1.5 | 0.92 | 0.96 $^d$ | 1.00 | 0.96 $^d$ | 0.92 | 0.96 $^d$ | 1.00 | 1.00 $^d$ |
| | 2.5 | 0.92 | 0.96 $^d$ | 1.00 | 1.00 $^d$ | 1.00 | 1.00 $^d$ | 1.00 | 1.00 $^d$ |
| | 3.5 | 0.75 | 0.76 $^d$ | 0.77 | 0.80 $^d$ | 0.83 | 0.87 $^d$ | 0.91 | 0.91 $^d$ |
| | 4.5 | 0.91 | 0.87 $^d$ | 0.83 | 0.83 $^d$ | 0.83 | 0.83 $^d$ | 0.83 | 0.91 |
| | 5.5 | 1.00 | 0.93 $^d$ | 0.86 | 0.83 $^d$ | 0.80 | 0.86 $^d$ | 0.92 | 0.92 $^d$ |
| | 6.5 | 1.00 | 1.00 $^d$ | 1.00 | 1.00 $^d$ | 1.00 | 1.00 $^d$ | 1.00 | 1.00 $^d$ |
| | 7.0 | | | | | | | | |
| | 7.5 | | | | | | | | |
| | 8.0 | | | | | | | | |
| | 8.5 | | | | | | | | |
| | 9.0 | | | | | | | | |
| | 9.5 | | | | | | | | |

| Pilot Reliability | | Oxygen Flow (slm) | | | | | | | |
|---|---|---|---|---|---|---|---|---|---|
| | | 19.5 | 20.5 | 21.5 | 22.5 | 23.5 | 24.5 | 25.5 | 26.5 |
| Fuel Flow (slm) | 1.5 | 1.00 | 0.77 $^d$ | 0.55 | | | | | |
| | 2.5 | 1.00 | 1.00 $^d$ | 1.00 | 1.00 $^d$ | 1.00 | 1.00 $^d$ | 1.00 | 0.75 |
| | 3.5 | 0.91 | 0.95 $^d$ | 1.00 | 1.00 $^d$ | 1.00 | 1.00 $^d$ | 1.00 | 1.00 |
| | 4.5 | 1.00 | 1.00 $^d$ | 1.00 | 1.00 $^d$ | 1.00 | 1.00 $^d$ | 1.00 $^d$ | 1.00 |
| | 5.5 | 0.92 | 0.92 $^d$ | 0.92 | 0.92 $^d$ | 0.92 | 0.96 $^d$ | 1.00 $^d$ | 1.00 |
| | 6.5 | 1.00 | 0.93 $^d$ | 0.86 | 0.86 $^d$ | 0.86 | 0.93 $^d$ | 1.00 $^d$ | 1.00 |
| | 7.0 | | | | | | | | |
| | 7.5 | | | | | | | | |
| | 8.0 | | | | | | | | |
| | 8.5 | | | | | | | | |
| | 9.0 | | | | | | | | |
| | 9.5 | | | | | | | | |

Superscript "d" indicates a situation where oxygen over-powers the fuel gas.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of operating an auto-ignition gas torch comprising:
   providing an initiation trigger on an underside of a handle portion, the initiation trigger including a latch extending out of an underside of a trigger body;
   initiating a flow of preheat oxygen above zero;
   initiating a flow of fuel gas to a level lower than the flow of preheat oxygen, wherein the flow of preheat oxygen is from about two times to about six times higher than the flow of fuel gas thereby creating an oxygen-rich mixture with the flow of preheat oxygen and the flow of fuel gas, wherein the flow of preheat oxygen and the flow of fuel gas are initiated following activation of the initiation trigger, the activation of the initiation trigger including moving the latch within the trigger body, towards a proximal end of the handle portion and away from a head portion, to reposition an upper extension of the latch from an off position to a second position in which the upper extension engages a cavity within a handle body, and simultaneously pivoting the trigger body about a hinge portion and upwards toward the handle body, against a force of a biasing member, to cause a gas control device to engage a corresponding internal receptacle of the trigger body;
   igniting the oxygen-rich mixture of the flow of preheat oxygen and the flow of fuel gas; and
   shutting off the gas torch by allowing the trigger body to pivot about the hinge portion and away from the handle body, as a result of the force of the biasing member, the upper extension of the latch automatically moving from the second position to the off position.

2. The method according to claim 1, wherein the flow of preheat oxygen is from about 10 SCFH to about 22 SCFH.

3. The method according to claim 1, wherein the flow of fuel gas is from about 1.5 SCFH to about 4 SCFH.

4. The method according to claim 3, wherein the fuel gas is acetylene.

5. The method according to claim 1, wherein the flow of preheat oxygen is from about 6 SCFH to about 27 SCFH.

6. The method according to claim 1, wherein the flow of fuel gas is from about 1.5 SCFH to about 6 SCFH.

7. The method according to claim 6, wherein the fuel gas is methane.

8. The method according to claim 1, wherein the flow of preheat oxygen is from about 7 SCFH to about 27 SCFH.

9. The method according to claim 1, wherein the flow of fuel gas is from about 1.5 SCFH to about 9.5 SCFH.

10. The method according to claim 9, wherein the fuel gas is propane.

11. A method of operating an auto-ignition gas torch comprising:
providing an initiation trigger on an underside of a handle portion, the initiation trigger including a latch extending out of an underside of a trigger body;
initiating a flow rate of preheat oxygen to a level that is an order of magnitude higher than a flow rate of fuel gas thereby creating an oxygen-rich mixture with the flow of preheat oxygen and the flow of fuel gas, wherein the flow of preheat oxygen and the flow of fuel gas are initiated following activation of the initiation trigger, the activation of the initiation trigger including moving the latch within the trigger body, towards a proximal end of the handle portion and away from a head portion, to reposition an upper extension of the latch from an off position to a second position in which the upper extension engages a cavity within a handle body, and simultaneously pivoting the trigger body about a hinge portion and upwards toward the handle body, against a force of a biasing member, to cause a gas control device to engage a corresponding internal receptacle of the trigger body;
igniting the oxygen-rich mixture of the flow of preheat oxygen and the flow of fuel gas; and
shutting off the gas torch by allowing the trigger body to pivot about the hinge portion and away from the handle body, as a result of the force of the biasing member, the upper extension of the latch automatically moving from the second position to the off position.

12. The method according to claim 11, wherein the flow of preheat oxygen is from about 10 SCFH to about 22 SCFH, the flow of fuel gas is from about 1.5 SCFH to about 4 SCFH, and the fuel gas is acetylene.

13. The method according to claim 11, wherein the flow of preheat oxygen is from about 6 SCFH to about 27 SCFH, the flow of fuel gas is from about 1.5 SCFH to about 6 SCFH, and the fuel gas is methane.

14. The method according to claim 11, wherein the flow of preheat oxygen is from about 7 SCFH to about 27 SCFH, the flow of fuel gas is from about 1.5 SCFH to about 9.5 SCFH, and the fuel gas is propane.

15. A method of operating an auto-ignition gas torch comprising:
providing an initiation trigger on an underside of a handle portion, the initiation trigger including a latch extending out of an underside of a trigger body;
providing a flow rate of preheat oxygen that is higher than a flow rate of fuel gas thereby creating an oxygen-rich mixture with the flow of preheat oxygen and the flow of fuel gas;
igniting the oxygen-rich mixture of the flow of preheat oxygen and the flow of fuel gas, wherein the flow of preheat oxygen and the flow of fuel gas are initiated following activation of the initiation trigger, the activation of the initiation trigger including moving the latch within the trigger body, towards a proximal end of the handle portion and away from a head portion, to reposition an upper extension of the latch from an off position to a second position in which the upper extension engages a cavity within a handle body, and simultaneously pivoting the trigger body about a hinge portion and upwards toward the handle body, against a force of a biasing member, to cause a gas control device to engage a corresponding internal receptacle of the trigger body; and
shutting off the gas torch by allowing the trigger body to pivot about the hinge portion and away from the handle body, as a result of the force of the biasing member, the upper extension of the latch automatically moving from the second position to the off position.

16. The method according to claim 15, wherein the flow rate of preheat oxygen is an order of magnitude higher than the flow rate of fuel gas.

17. The method according to claim 15, wherein the flow of preheat oxygen is from about 10 SCFH to about 22 SCFH, the flow of fuel gas is from about 1.5 SCFH to about 4 SCFH, and the fuel gas is acetylene.

18. The method according to claim 15, wherein the flow of preheat oxygen is from about 6 SCFH to about 27 SCFH, the flow of fuel gas is from about 1.5 SCFH to about 6 SCFH, and the fuel gas is methane.

19. The method according to claim 15, wherein the flow of preheat oxygen is from about 7 SCFH to about 27 SCFH, the flow of fuel gas is from about 1.5 SCFH to about 9.5 SCFH, and the fuel gas is propane.

20. A method of operating an auto-ignition gas torch comprising:
providing an initiation trigger on an underside of a handle portion, the initiation trigger including a latch extending out of an underside of a trigger body;
creating an oxygen-rich mixture of a preheat oxygen and a fuel gas by providing a flow rate of the preheat oxygen that is higher than a flow rate of the fuel gas, the flow rate of the preheat oxygen being from about 10 SCFH to about 22 SCFH, the flow rate of the fuel gas being from about 1.5 SCFH to about 4 SCFH, and the fuel gas being acetylene, wherein the flow of preheat oxygen and the flow of fuel gas are initiated following activation of the initiation trigger, the activation of the initiation trigger including moving the latch within the trigger body, towards a proximal end of the handle portion and away from a head portion, to reposition an upper extension of the latch from an off position to a second position in which the upper extension engages a cavity within a handle body, and simultaneously pivoting the trigger body about a hinge portion and upwards toward the handle body, against a force of a biasing member, to cause a gas control device to engage a corresponding internal receptacle of the trigger body;
igniting the oxygen-rich mixture of the preheat oxygen and the fuel gas; and
shutting off the gas torch by allowing the trigger body to pivot about the hinge portion and away from the handle body, as a result of the force of the biasing member, the upper extension of the latch automatically moving from the second position to the off position.

\* \* \* \* \*